(12) United States Patent
Kuo et al.

(10) Patent No.: US 6,473,443 B1
(45) Date of Patent: Oct. 29, 2002

(54) SYSTEM AND METHOD FOR GENERATING A GRATING IMAGE

(75) Inventors: Chi-Wang Kuo, Kaohsiung (TW); Shyh-Tsong Lin, Taipei (TW)

(73) Assignee: Kutai Electrical Industrial Co., Ltd., Taiwan (TW)

( * ) Notice: Subject to any disclaimer, the term of this patent is extended or adjusted under 35 U.S.C. 154(b) by 0 days.

(21) Appl. No.: 09/558,565

(22) Filed: Apr. 26, 2000

(51) Int. Cl.[7] .............................. H01S 3/10; H01S 3/08; G02B 6/34

(52) U.S. Cl. ................ 372/24; 372/100; 372/101; 372/102; 372/103; 365/37

(58) Field of Search .................... 372/24, 100, 101, 372/102, 103, 107; 385/33, 36, 37

(56) References Cited

U.S. PATENT DOCUMENTS 6,084,998 A * 7/2000 Straayer ..................... 385/37

* cited by examiner

Primary Examiner—Paul Ip
Assistant Examiner—Armando Rodriguez
(74) Attorney, Agent, or Firm—Jackson Walker L.L.P.

(57) ABSTRACT

A method and a system for generating grating images with an improved speed is disclosed. The system utilizes a coherent light source for providing a coherent beam L, an exposure control device for controlling the exposure of the coherent beam L, a beam guiding device for controlling the pitch and the orientation of each grating, a symmetrical beam generating device for splitting the coherent beam L into two symmetrical coherent beams, a local scan device for allowing the two coherent beams to intersect and form a standing wave, at different position in a small local scan area in order to combine different gratings in the local scan area, a photosensitive material for recording the standing wave, and a supporting device for supporting and moving the photosensitive material so as to combine different local scan area, and obtain a large scale grating image.

4 Claims, 7 Drawing Sheets

SYSTEM AND METHOD FOR GENERATING A GRATING IMAGE

FIELD OF THE INVENTION

The present invention relates to a method for generating a grating image and, more particularly to a method which can generate a grating image in an improved speed.

DESCRIPTION OF THE RELATED ART

In general, a grating image is formed by arranging and combining various micro-gratings. Gratings which have different pitch, orientation and different diffraction efficiencies, will generate various diffraction effects on different wavelength of light. Therefore, it is understood that in order to generate a grating image, it is necessary to control the pitch of each grating, the orientation, the diffraction efficiency and the scale of the gratings as well.

FIG. 1 is a conventional method to generate a grating. A laser beam "a" and a coherent laser beam "b" intersect and form an interferenced standing wave at the intersection area. By placing photosensitive material at the plane A—A, a grating can be formed by recording the interferenced standing waves.

FIG. 2 and FIG. 3 show another method to generate a grating. It can be seen from FIG. 2 that a pair of parallel coherent laser beams "a1" and "b1" irradiate onto a lens (51) in the vertical direction. After being refracted by the lens (51), the pair of laser beams "a1" and "b1" intersect at the focus point of the lens (51) and form a standing wave. By placing a photosensitive material (6) at the focal plane of the lens (51), a grating can be obtained by recording the standing wave. If the locations where the laser beams "a1" and "b1" incidence the lens (51) are adjusted, the pitch and orientation of the gratings will be changed. Alternatively, by adjusting the exposure, the diffraction efficiency of the gratings will be changed. Also, by adjusting the beam size and the divergence angle of the laser beams "a1" and "b1" the size of the generated gratings will be changed.

FIG. 4 is a previous art for generating a grating image. A laser source (11) is used for sending out a laser beam "L". An acusto-optic modulator (21) (called "AOM" hereinafter) is utilized for controlling the exposure. At the beginning, the laser beam "L" is emitted from the laser source and passes through the AOM (21) and a beam expander "3a". The beam expander "3a" is composed of the first lens (31) and the first lens (31) or the second lens (32), the divergence angle of the laser beam "L" can be adjusted, therefore the size of the generated gratings can be adjusted. The first reflector (111) is located behind the beam expander "3a" to reflect and change direction of the laser beam "L" through the beam expander "a". Then the laser beam "L" enters a beam splitting and beam guiding device "4a". The beam splitting and beam guiding device "4a" includes a beam splitter (41) which is provided for splitting the laser beam "L" into two beams "a2" and "b2". The second reflector (42) and the third reflector (44) are arranged within the beam splitting and guiding device "4a" for changing direction of the beam "a2" and allow it to vertically irradiate onto the lens (51A). The fourth reflector (43) is also arranged within the beam splitting and guiding device "4a" for changing direction of the beam "b2" and allow it to vertically irradiate onto the lens (51). After that, the beams "a2" and "b2" intersect at the focus of the lens (51A) and forms an interferenced standing wave. By placing a photosensitive material (6A) at the focal plane of the lens (51A), the standing wave can be recorded and generate a grating. It is obvious that by moving the beam splitter (41) and the second reflector (42), the distance between two beams "a2" and "b2" will be changed. Therefore, the pitch of the gratings can be changed accordingly. Alternatively, if the beam splitting and beam guiding device (4a) is rotated along the direction of the incident optical axis of the laser beam "L", the orientation of the generated gratings will be changed. A precise translation stage (71) is provided for supporting and moving the photosensitive material (6A). It can be understood that different grating can be combined upon displacement of the photosensitive material (6) so as to form a grating image. In this method, the AOM (21), the beam expander "3a", the beam splitting and beam guiding device "4a" and the precise translation stage (71) can be controlled by computer and realize automation. The method of using the beam splitting and beam guiding device "4a" and the lens (51A) is mirrored from the known Laser Doppler Anemometer (hereinafter called "LDA") technology. The speed of generating grating images may be limited due to a slow dynamic response of the beam splitting and guiding device "4a" and the precise translation stage (71). This is a main shortcoming of the previous arts of generating grating images.

SUMMARY OF THE INVENTION

A main object of the present invention is to provide an improved method for generating grating images which is able to greatly increase the speed of the grating image generation by utilizing the technique of beams guiding, symmetrical beams forming and local scan.

In accordance with one aspect of the present invention, a method for generating a grating image comprises a step of generating a coherent beam, a step of controlling exposure of the coherent beam, a step of guiding the coherent beam to a required location, a step of splitting the coherent beam into two symmetrical coherent beams, a step of local scanning, allowing the symmetrical coherent beams to intersect and form an interferenced standing wave at different position in a small local scan area, a photoactive step for recording a grating on a photosensitive material, and a step of changing the position of the the photosensitive material, combining different local scan areas which are full with gratings and forming a large scale grating image.

In accordance with another aspect of the present invention, a system for generating a grating image, comprises a coherent light source for providing a coherent beam "L", an exposure control device for the coherent beam "L" to pass therethrough and control the exposure of the coherent beam "L", a beam guiding device for controlling the pitch and the orientation of each grating, a symmetrical beam generating device for splitting the coherent beam "L" into two symmetrical coherent beams, a local scan device for allowing the two coherent beams to intersect and form a standing wave at different position in a small local scan area, a photosensitive material for recording the standing wave, and a supporting device for supporting and moving the photosensitive material so as to combine different local scan areas which are full with gratings.

DETAILED DESCRIPTION OF PREFERRED EMBODIMENT

Figure 5:
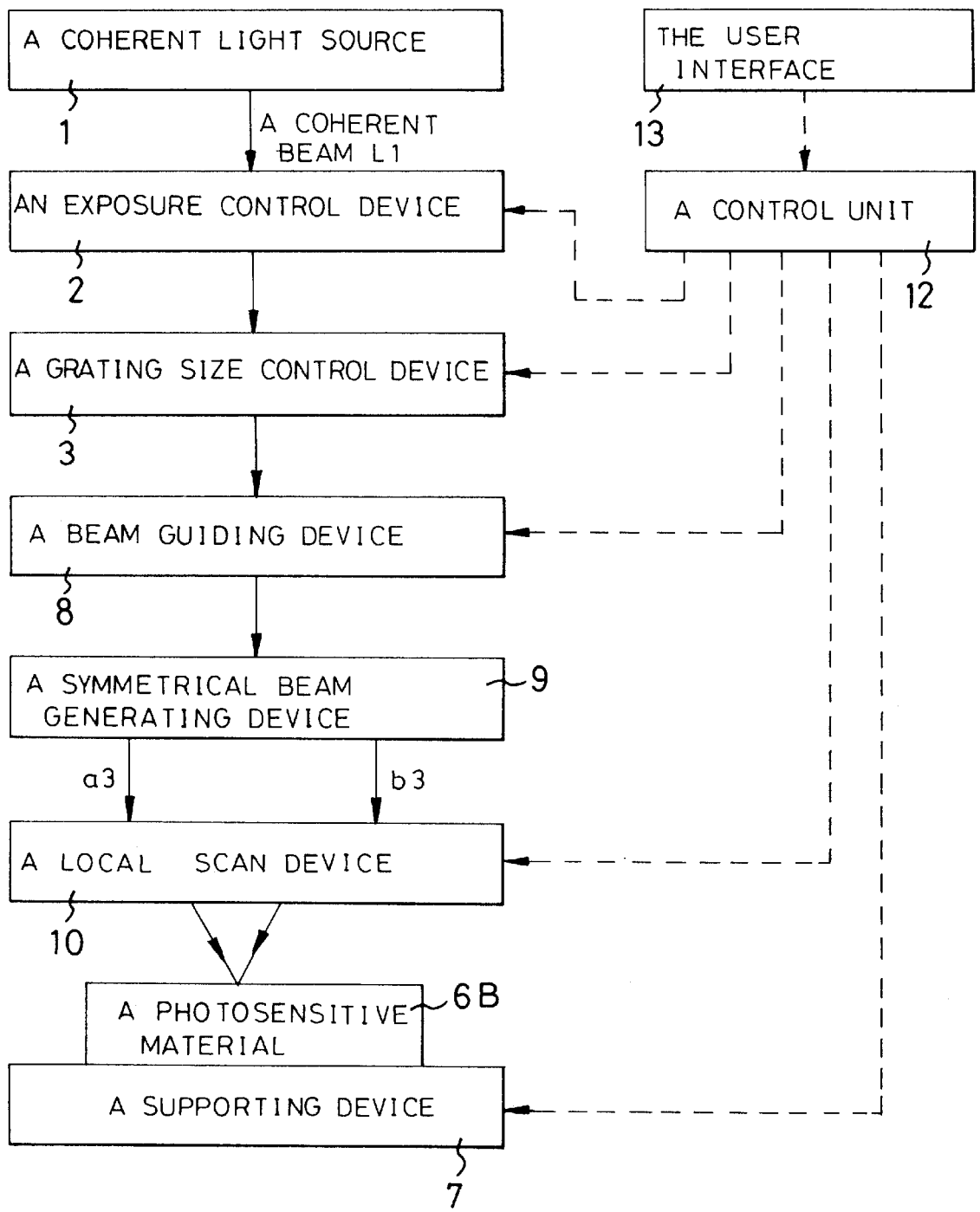
FIG. 5 is a block view of a method for generating a grating image in accordance with the present invention.

FIG. 5 is a block view of a system and a method for generating a grating image in accordance with the present invention. In the figure, each block represents a functional unit. A solid line represents a coherent beam. A solid arrow represents a propagating direction of the coherent beams. A dashed line represents the transmission of control signals.

The system for generating a grating image of FIG. 5 substantially comprises a coherent US light source (1) for providing a coherent beam "L1", an exposure control device (2) for the coherent beam "L1" to pass therethrough and control the exposure of the coherent beam "L1", a grating size control device (3) disposed behind the exposure control device (2) and provided for controlling the size of the gratings, a beam guiding device (8) arranged behind the grating size control device (3) for controlling the pitch and the orientation of each grating, a symmetrical beam generating device (9) located behind the beam guiding device (8) and provided for splitting the coherent beam "L1" into two symmetrical coherent beams "a3" and "b3", a local scan device (10) disposed behind the symmetrical beam generating device (9) for allowing the two coherent beams "a3" and "b3" to intersect and form a standing wave at different position in a small local scan area, a photosensitive material (6B) arranged beneath the local scan device (10) for recording the standing wave, a supporting device (7) for supporting and moving the photosensitive material (6B) so as to combine the different local scan areas which are fill with gratings, a user interface (13) used as a data input interface, a control unit (12) connected with the user interface (13), the exposure control device (2), the grating size control device (3), the beam guiding device (8), the local scan device (10) and the supporting device (7). The control unit (12) is provided for receiving input signals from the user interface (13) and transfer them into control signal, thereby controlling each of the devices mentioned above.

The coherent source (1), the exposure control device (2), the grating size control device (3), the photosensitive material (6B), the supporting device (7), the control unit (12) and the user interface (13) are well known technology, so a detailed description thereof is omitted. Now the beam guiding device (8), the symmetrical beam generating device (9) and the local scan device (10) will be illustrated in detail.

Figure 6:
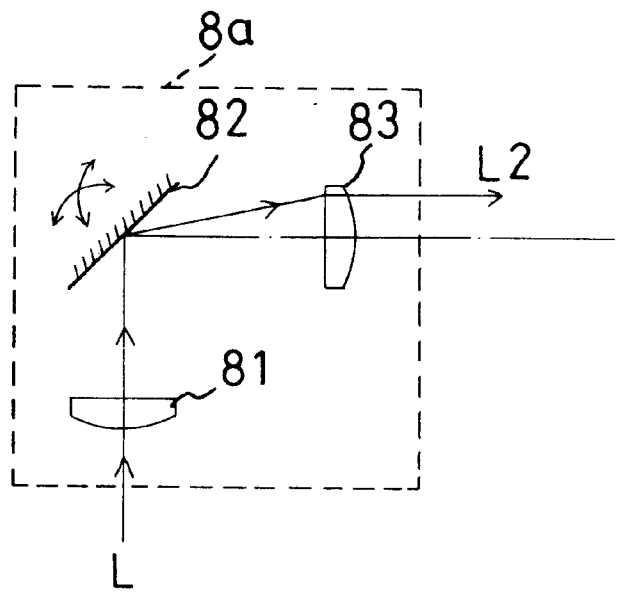
FIG. 6 is a schematic view showing a preferred embodiment of a beam guiding device of the present invention.

Referring to FIG. 6, the beam guiding device (8a) in accordance with a preferred embodiment of the present invention includes the first lens (81), a scanning mirror (82) located in a direction along the exit of the lens (81), and the second lens (83) arranged corresponding to the scanning mirror (82). The distance between the second lens (83) and the rotation center of the scanning mirror (82) equals the focal length of the second lens (83). When a laser beam "L2" irradiates the first lens (81), it will be focused onto the rotation center of the scanning mirror (82) after it exits from the first lens (81). Being reflected by the scanning mirror (82) the laser beam "L2" will be refracted by the second lens (83) and parallelized with the optical axis of the second lens (83). With this arrangement, by rotating the scanning mirror (82), the distance between laser beam "L2" and the optical axis of the second lens (83) can be controlled. The scanning mirror (82) shall be rotated in two dimensions in order to translate the laser beam "L2" in two dimensions. In the situation that the scanning mirror (82) is configured to be rotated in one dimension, it is acceptable to use two sets of beam guiding devices (8a) as shown in FIG.6 to obtain the same effect.

Figure 7:
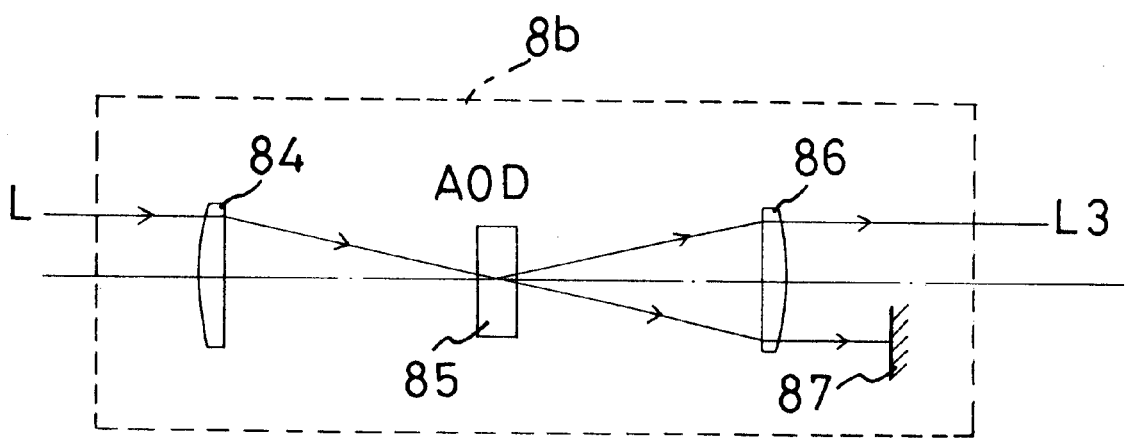
FIG. 7 is a schematic view showing the second preferred embodiment of the beam guiding device of the present invention.

FIG. 7 shows the second preferred embodiment of the beam guiding device (8b) in accordance with the present invention. The beam guiding device (8b) includes the first lens (84), an acusto-optic deflector (85) (called "AOD" hereinafter) arranged at the exit side of the first lens (84), the second lens (86) located at the opposite side of the AOD (85) and a light stop (87) corresponding to the second lens (86). The distance between the first lens (84) and the AOD (85) equals the focal length of the first lens (84) and the distance between the second lens (86) and the AOD (85) equals the focal length of the second lens (86). When the laser beam "L3" irradiates the first lens "84", it will be focused onto the AOD (85) after it exits from the first lens (84). The laser beam "L3" will be diffracted by the AOD (85), only the first order diffracted light will be utilized. Then the laser beam "L3" will be refracted by the second lens (86) and parallelized with the optical axis of the second lens (86). The light stop (87) is provided for sheltering redundant light passed through the second lens (86). With this arrangement, by controlling the diffraction angle of the first order diffraction light, the translation of the laser beam "L3" can be controlled accordingly. Generally, a typical AOD (85) can be used for guiding beams in one dimension. Therefore, it is necessary to use two sets of the beam guiding devices (8b) as shown in FIG. 7 for a two-dimensional beam guiding.

Figure 8:
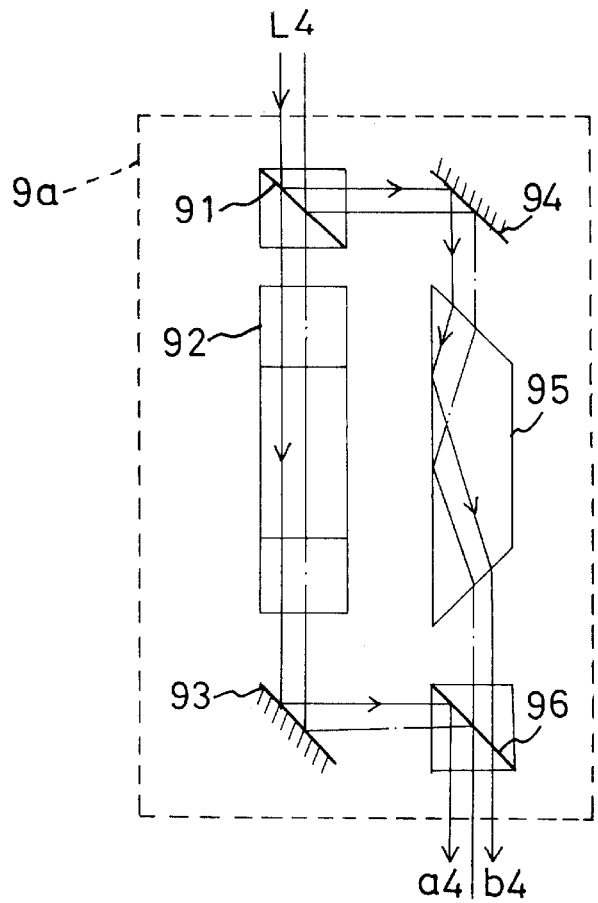
FIG. 8 is a schematic view showing a preferred embodiment of a symmetrical beam generating device of the present invention.

Referring to FIG. 8, a preferred embodiment of the symmetrical beam generating device (9a) in accordance with the present invention includes the first beam splitter (91), the first dove prism (92) corresponding to the transmission side of the first beam splitter (91), the first reflector (93) corresponding to the exit of the first dove prism (92), the second reflector (94) corresponding to the reflection side of the first beam splitter (91), the second dove prism (95) corresponding to the exit of the second reflector (94), and the second beam splitter (96) having two sides respectively corresponding to the exit of the first reflector and the exit of the second dove prism (95). When the laser beam "L4" irradiates the symmetrical beam generating device (9a) after being translated by the beam guiding device (8), it will be split into two beams "a4" and "b4" by the first beam splitter (91). The beam "a4" passes in sequence through the first dove prism (92), the first reflector (93) and the 9. second beam splitter (96), then exits from the symmetrical beam generating device (9a). The beam "b4" passes in sequence through the second reflector (94), the second dove prism (95) and the second beam splitter (96), then exits from the symmetrical beam generating device (9a). The first and second dove prisms (92, 95) of the symmetrical beam generating device (9a) have the properties of reversing image. For instance, on the plane in parallel with the FIG. 8, the laser beam "L4" can be reversed to the opposite side by the second dove prism (95). Since the first dove prism (92) is arranged perpendicularly to the second dove prism (95), it will not affect the laser beam "L4" on such a plane as shown by FIG. 8. And on the plane which perpendicular with FIG. 8, the effect is vice versa. With this arrangement, the beams "a4" and "b4" become symmetrical to each other in respect to the output optical axis of the symmetrical beam generating device (9a).

Figure 1:
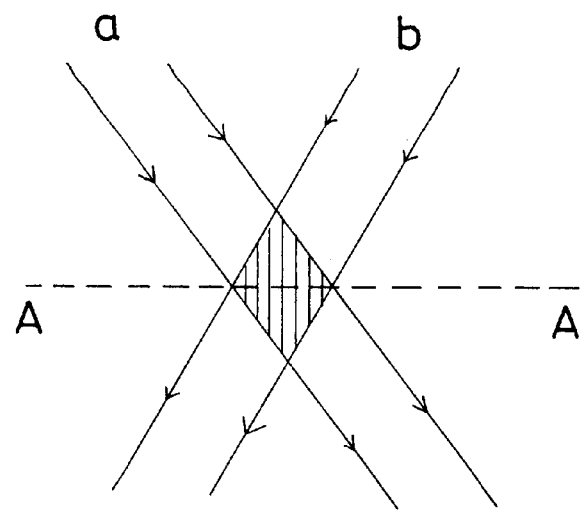
FIG. 1 is a schematic view showing a conventional method for generating a grating.
Figure 2:
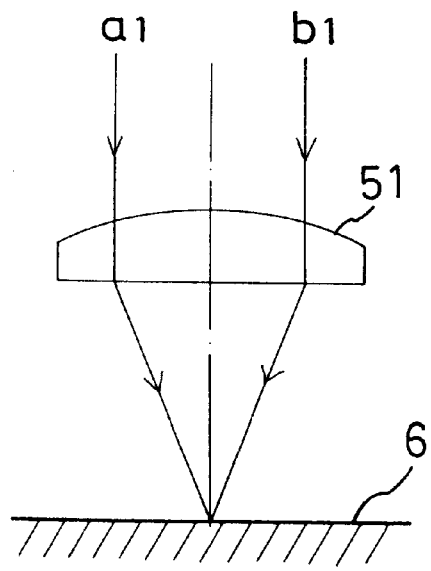
FIG. 2 is a schematic view showing another conventional method for generating a grating.
Figure 3:
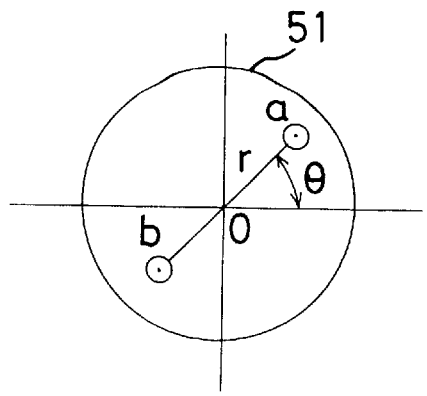
FIG. 3 is a top view of FIG. 2.
Figure 4:
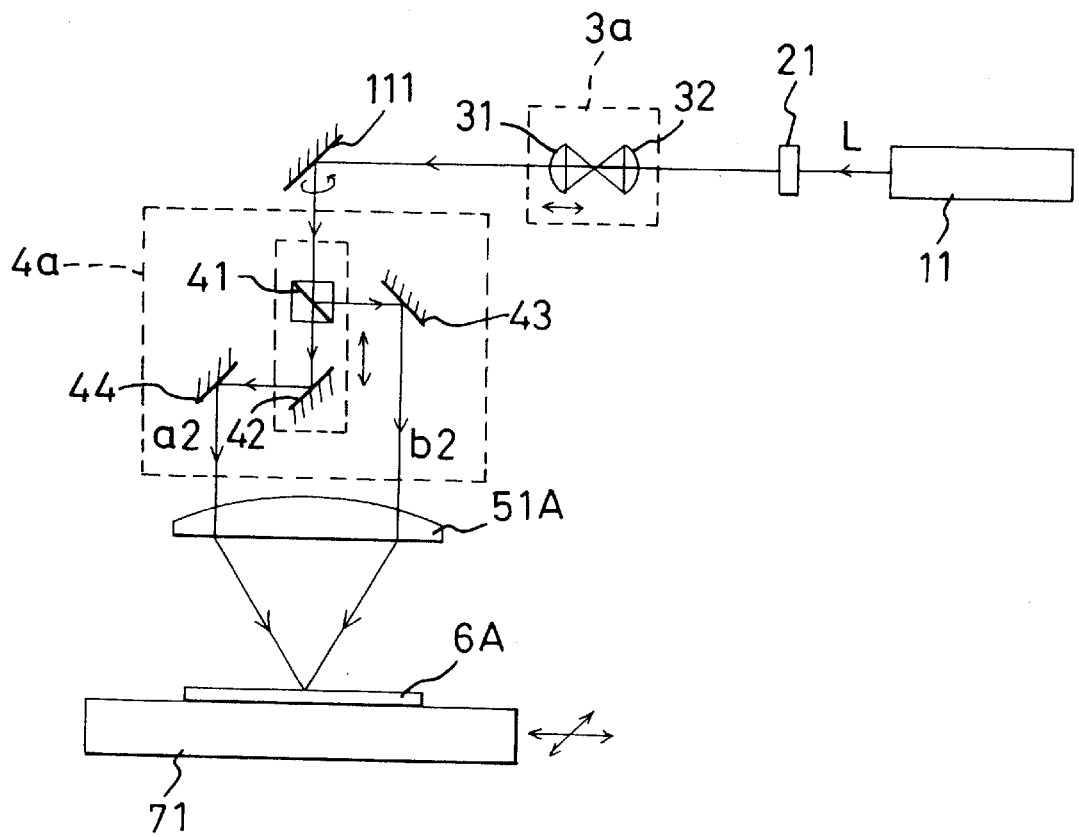
FIG. 4 is a schematic view showing a previous art for generating a grating image.

By using the beam guiding device and the symmetrical beam generating device, the location where the laser beam "a1" and "b1" incidence the lens (51) which shown by FIG. 2 and FIG. 3 can be controlled, the grating pitch and orientation as well.

Figure 9:
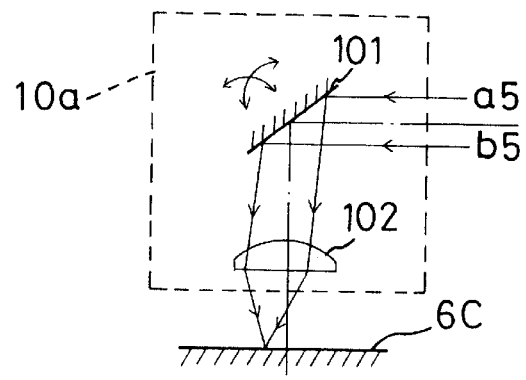
FIG. 9 is a schematic view showing a preferred embodiment of a local scan device of the present invention.

FIG. 9 shows a preferred embodiment of the local scan device (10a) in accordance with the present invention. The local scan device (10a) includes a scanning mirror (101) corresponding to the symmetrical beams "a5" and "b5" output from the symmetrical beam generating device (9a), a lens (102) arranged corresponding to the exit of the scanning mirror (101). When the symmetrical beams "a5" and "b5" incidence the scanning mirror (101), both of them will be reflected toward the lens (102). placing the photosensitive material (6C) on a focus plane of the lens (102), the symmetrical beams "a5" and "b5" will be focused on the photosensitive material (6C) and forms interference patterns thereon. Since incidence direction of the symmetrical beams "a5" and "b5" can be changed by control the scanning mirror (101), the position of the interference pattern formed on the photosensitive material (6C) can be controlled accordingly. By this way, the local scan device can combine different gratings in a small local scan area.

Figure 10:
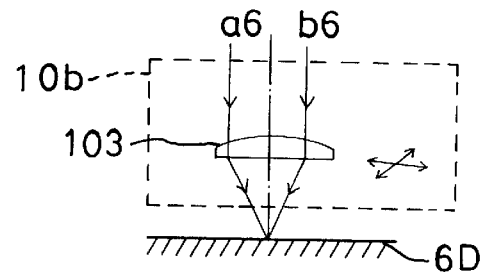
FIG. 10 is a schematic view showing the second preferred embodiment of a local scan device of the present invention.

FIG. 10 shows the second preferred embodiment of the local scan device (10b) in accordance with the present invention. The local scan device (10b) substantially includes a scanning lens (103). When the symmetrical beams "a6" and "b6" incidence the scanning lens (103), they will be focused on a photosensitive material (6D) which is placed on a focal plan of the scanning lens (103), and form interference patterns thereon. By moving the scanning lens (103) transversely, the position of the interference pattern formed on the photosensitive material (6D) can be controlled accordingly.

Figure 11:
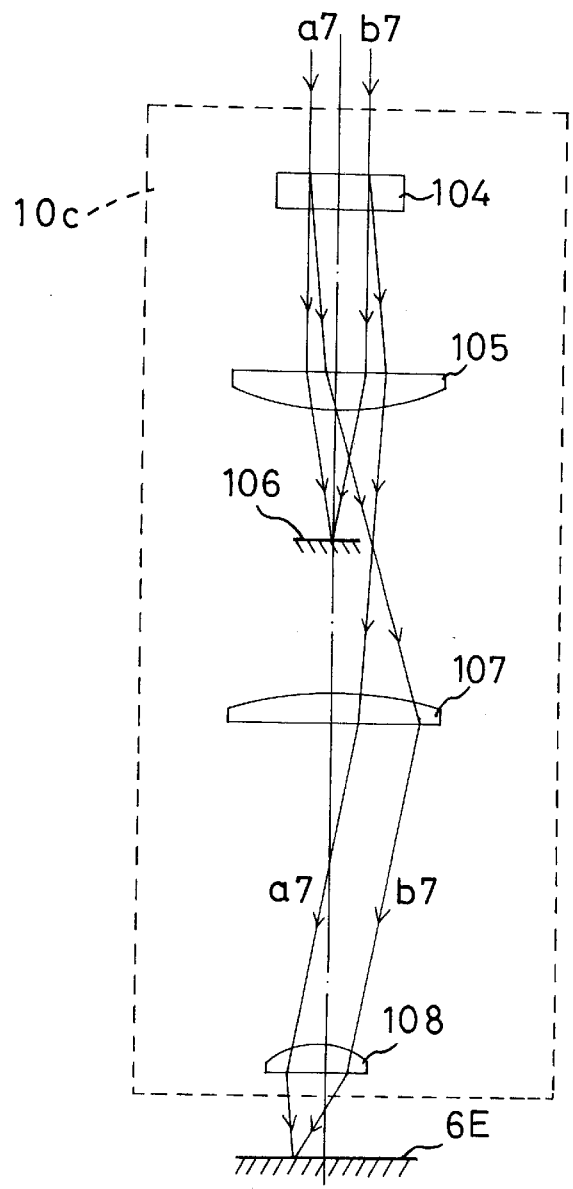
FIG. 11 is a schematic view showing the third preferred embodiment of the local scan device of the present invention.

Referring to FIG. 11, the third preferred embodiment of the local scan device (10c) in accordance with the present invention includes an AOD (104), the first lens (105) corresponding to the exit of the AOD (104), a light stop (106) provided for sheltering redundant light passing through the first lens (105), the second lens (107) corresponding to the exit of the first lens (105), and the third lens (108) corresponding to the exit of the second lens (107). When the symmetrical beams "a7" and "b7" irradiate the AOD (104), the first order diffraction light will be generated by the AOD (104). Then the symmetrical beams "a7" and "b7" pass through the first lens (105) and converge. The light stop (106) is placed at the focal point of the first lens (105) in order for sheltering the converged beams except for the first order diffraction light. Then the first order diffraction light from the beams "a7" and "b7" enter the second lens (107) and are deflected to be parallel to each other. Finally, the paralleled diffraction light passes through the third lens (108), being focused on a photosensitive material (6E), and forms interference patterns. It is understood that by controlling the AOD (104), the incidence angle of the paralleled diffraction light respect to the third lens (108) can be changed and the position of the interference pattern on the photosensitive material (6F) can be controlled accordingly.

From the above paragraphs, the construction and operation of the system in accordance with the present invention can be readily understood.

Figure 12:
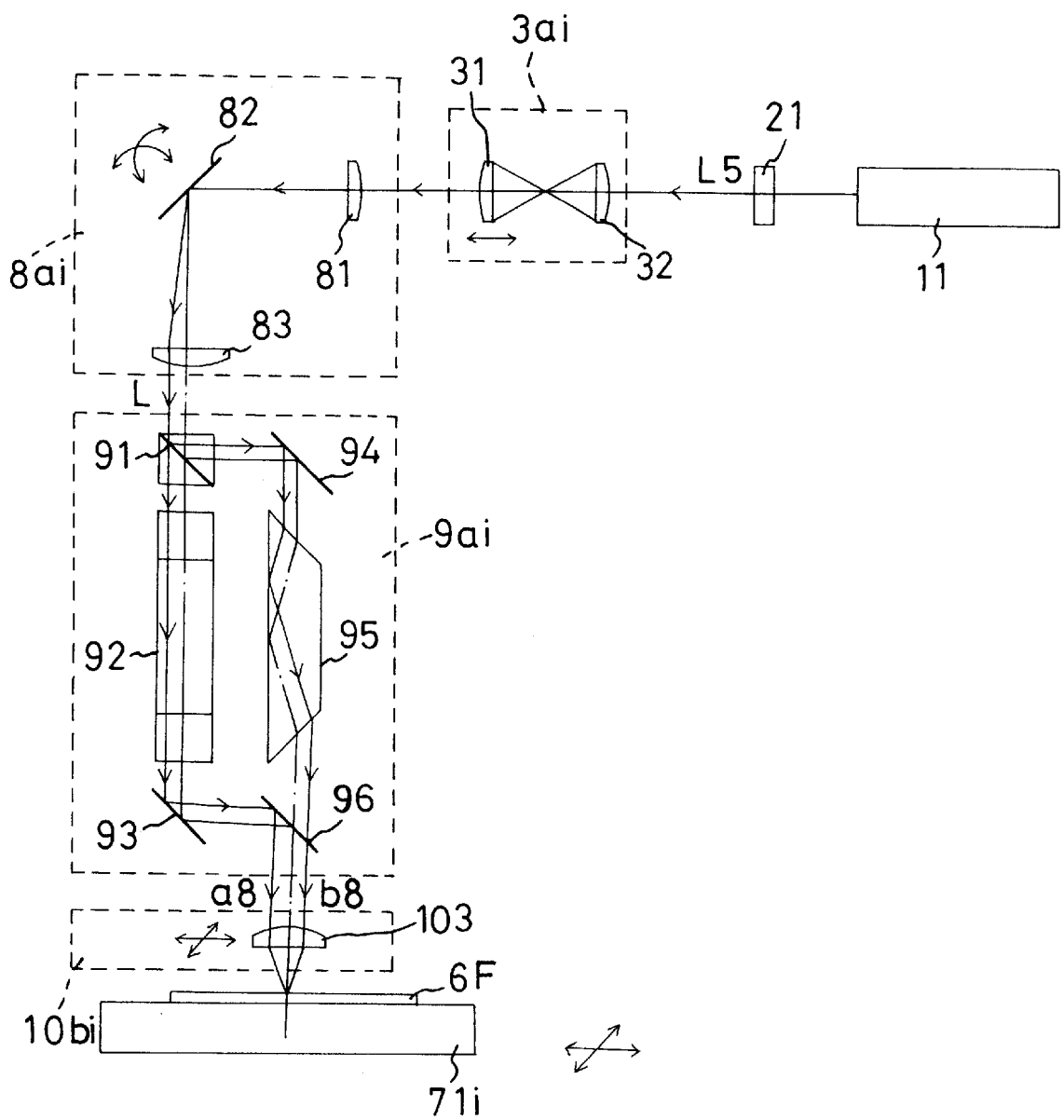
FIG. 12 is a schematic view showing a preferred embodiment of a system for generating a grating image in accordance with the present invention.

FIG. 12 combines each of the above devices and shows a schematic view of the system in accordance with a preferred embodiment of the invention. In operation, the laser source (11) emits a laser beam "L5". The laser beam "L5" enters the AOM (21) which is provided for controlling exposure. Then the laser beam "L5" passes through the beam expander (3ai) used for adjustment of the grating scale and is output to the beam guiding device (8ai). After exiting from the beam guiding device (8ai), the laser beam "L5" enters the symmetrical beam generating device (9ai) and is split into a pair of beams "a8" and "b8" symmetrically along the optical axis of the device. Then the pair of beams "a8" and "b8" pass through the local scan device (10bi), focused on the photosensitive material (6F), and forms an interference standing wave. The position of the interference standing wave formed on the photosensitive material (6F) can be controlled in order to combine various gratings in a small local scan area, such as a small square area. Once the combination of gratings in this small local scan area is completed, by moving the photosensitive material with translation stage (71i),another local scan can be executed in another small local scan area. In this way, combining all the small local scan areas of combined gratings, a large area grating image can be obtained. The operation of such a system is performed by the control unit (12) of FIG. 5, which is able to receive the input signal from the user interface (13) and transfer them into control signals, thereby to control each device of the system.

In the preferred embodiment of FIG. 12, the beam guiding device (8ai) may be replaced by the beam guiding device (8b) of FIG. 7, the local scan device (10bi) may be replaced by the device (10a) of FIG. 9 or the device (10c) of FIG. 11. In the situation that the beam guiding device (8ai) is used, the beam expander (3ai) can be omitted as long as when lens (81) moves back-and-forth, the divergence angle of laser beam (L) will change accordingly, so as the grating scales.

What is claimed is:

1. A system for generating a grating image, comprising:
a coherent light source for providing a coherent beam L;
an exposure control device for the coherent beam L to control the exposure of the coherent beam L;
a grating size control device disposed behind the exposure control device for controlling the size of the gratings;
a beam guiding device arranged behind the grating size control device for controlling the pitch and the orientation of each grating;
a symmetrical beam generating device located behind the beam guiding device and provided for splitting the coherent beam L into two symmetrical coherent beams;
a local scan device disposed behind the symmetrical beam generating device for allowing the two coherent beams to intersect and form standing wave at different position in a small local scan area;
a photosensitive material arranged beneath the local scan device for recording the standing wave; and a supporting device for supporting and moving the photosensitive material so as to combine different local scan area;

wherein said beam guiding device includes a first lens, a scanning mirror located in the direction along the exit of the first lens, and the second lens arranged corresponding to the exit of the scanning mirror.

2. A system for generating a grating image, comprising:

a coherent light source for providing a coherent beam L;

an exposure control device for the coherent beam L to control the exposure of the coherent beam L;

a grating size control device disposed behind the exposure control device for controlling the size of the gratings;

a beam guiding device arranged behind the grating size control device for controlling the pitch and the orientation of each grating;

a symmetrical beam generating device located behind the beam guiding device and provided for splitting the coherent beam L into two symmetrical coherent beams;

a local scan device disposed behind the symmetrical beam generating device for allowing the two coherent beams to intersect and form standing wave at different position in a small local scan area;

a photosensitive material arranged beneath the local scan device for recording the standing wave; and a supporting device for supporting and moving the photosensitive material so as to combine different local scan area;

wherein said beam guiding device includes a first lens, an acusto-optic deflector arranged at the exit side of the first lens, a second lens located at the exit side of the acusto-optic deflector and a light stop.

3. A system for generating a grating image, comprising:

a coherent light source for providing a coherent beam L;

an exposure control device for the coherent beam L to control the exposure of the coherent beam L;

a grating size control device disposed behind the exposure control device for controlling the size of the gratings;

a beam guiding device arranged behind the grating size control device exposure control device for controlling the pitch and the orientation of each grating;

a symmetrical beam generating device located behind the beam guiding device and provided for splitting the coherent beam L into two symmetrical coherent beams;

a local scan device disposed behind the symmetrical beam generating device for allowing the two coherent beams to intersect and form standing wave at different position in a small local scan area, a photosensitive material arranged beneath the local scan device for recording the standing wave; and a supporting device for supporting and moving the photosensitive material so as to combine different local scan area;

wherein the symmetrical beam generating device includes a first beam splitter, a first dove prism corresponding to the transmission side of the first beam splitter, a first reflector corresponding to the exit of the first dove prism, a second reflector corresponding to the reflection side of the first beam splitter, a second dove prism corresponding to the exit of the second reflector, and second beam splitter having two sides respectively corresponding to the exit of the first reflector and the exit of the second dove prism.

4. A system for generating a grating image, comprising:

a coherent light source for providing a coherent beam L;

an exposure control device for the coherent beam L to control the exposure of the coherent beam L;

a grating size control device disposed behind the exposure control device for controlling the size of the gratings;

a beam guiding device arranged behind the grating size control device for controlling the pitch and the orientation of each grating;

a symmetrical beam generating device located behind the beam guiding device and provided for splitting the coherent beam L into two symmetrical coherent beams;

a local scan device disposed behind the symmetrical beam generating device for allowing the two coherent beams to intersect and form standing wave at different position in a small local scan area;

a photosensitive material arranged beneath the local scan device for recording the standing wave; and a supporting device for supporting and moving the photosensitive material so as to combine different local scan area;

wherein the local scan device includes an acusto-optic deflector, a first lens corresponding to the exit of the acusto-optic deflector, a light stop for sheltering redundant light passing through the first lens, a second lens corresponding to the exit of the first lens, and a third lens corresponding to the exit of the second lens.

* * * * *